United States Patent [19]

Paymal

[11] 4,357,933
[45] Nov. 9, 1982

[54] ABSORBER FOR A SOLAR COLLECTOR

[75] Inventor: André Paymal, Saint Germain-en-Laye, France

[73] Assignee: Saint-Gobain Industries, Neuilly sur Seine, France

[21] Appl. No.: 177,758

[22] PCT Filed: Apr. 20, 1979

[86] PCT No.: PCT/FR79/00034

§ 371 Date: Dec. 10, 1979

§ 102(e) Date: Dec. 10, 1979

[30] Foreign Application Priority Data

Apr. 20, 1978 [FR] France ................ 78 11728

[51] Int. Cl.³ ................................ F24J 3/02
[52] U.S. Cl. ................... 126/449; 126/444; 165/170
[58] Field of Search ......... 126/449, 444, 445, DIG. 2; 165/170, 168; 29/157.3 D, 157.3 H

[56] References Cited

U.S. PATENT DOCUMENTS

| 574,157 | 12/1896 | Ljungstrom | 122/444 X |
|---|---|---|---|
| 3,734,178 | 5/1973 | Soudron | 165/170 |
| 4,010,733 | 3/1977 | Moore | 126/444 |
| 4,191,170 | 3/1980 | Carrell | 126/449 |
| 4,203,421 | 5/1980 | Bencic | 126/449 X |

FOREIGN PATENT DOCUMENTS

| 488538 | 12/1929 | Fed. Rep. of Germany | 165/170 |
|---|---|---|---|
| 52-36342 | 3/1977 | Japan | 126/444 |
| 256693 | 8/1926 | United Kingdom . | |
| 845178 | 8/1960 | United Kingdom . | |
| 560108 | 8/1977 | U.S.S.R. | 165/170 |

Primary Examiner—Samuel Scott
Assistant Examiner—Randall L. Green
Attorney, Agent, or Firm—Scully, Scott, Murphy & Presser

[57] ABSTRACT

The collector comprises two thin stamped metal sheets, joined together by welding at their periphery, between which flows a heat-carrying liquid and is characterized in that said metal sheets are stamped with repetitive patterns whose concave surfaces are disposed opposite each other, but with staggering in their plane equal to approximately half a pitch, and in that the flat unstamped parts of said metal sheets are joined together by spot welds disposed substantially symmetrically and evenly in relation to said patterns.

This collector is capable of resisting high pressures of the heat-carrying liquid.

3 Claims, 12 Drawing Figures

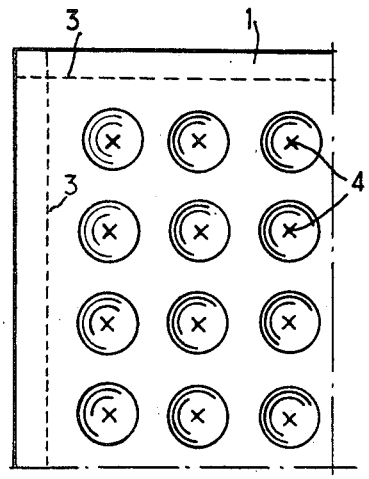
FIG. 1
PRIOR ART
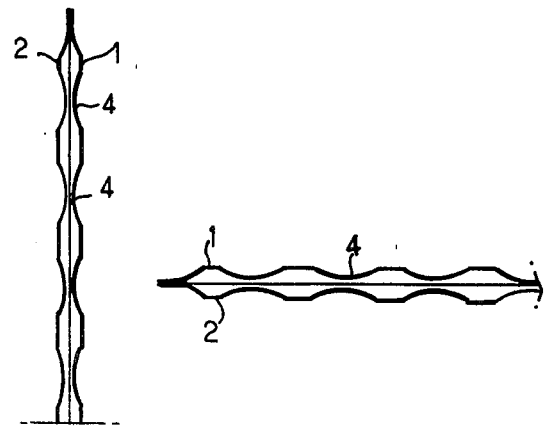
FIG. 2　　FIG. 3
PRIOR ART　PRIOR ART
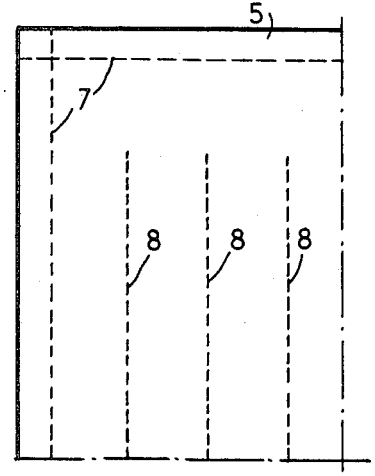
FIG. 4
PRIOR ART
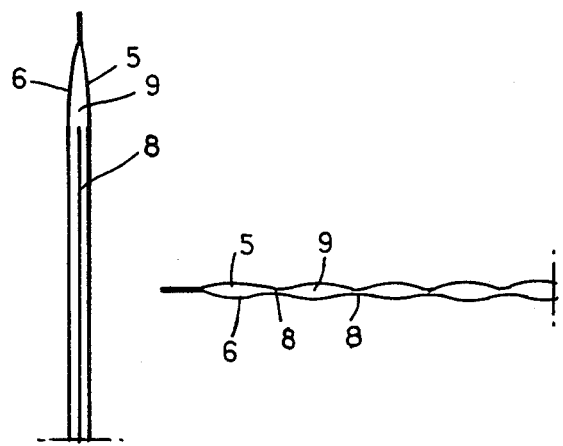
FIG. 5　　FIG. 6
PRIOR ART
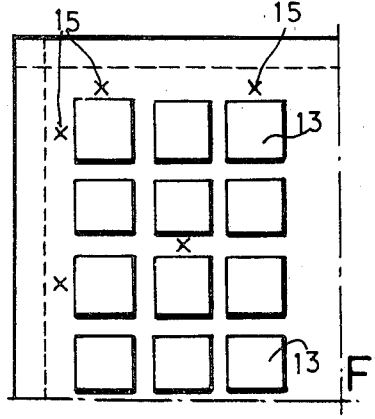
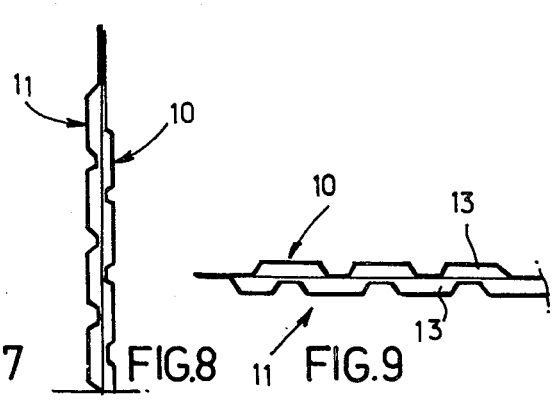
FIG. 7　　FIG. 8　　FIG. 9

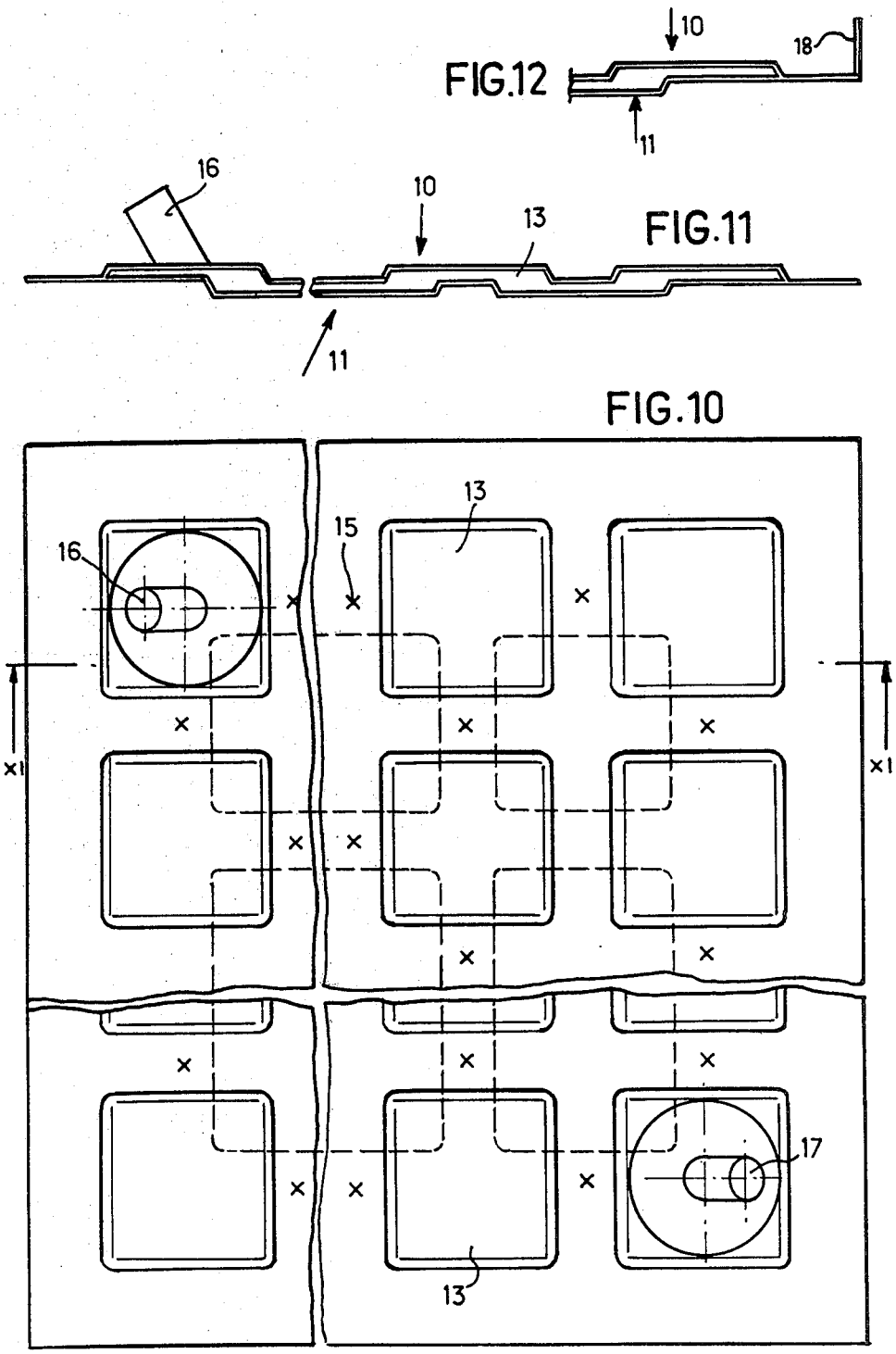

ABSORBER FOR A SOLAR COLLECTOR

BACKGROUND OF THE INVENTION

1. Field of the Invention

The invention relates to a new type of absorber for a solar collector.

It is known that flat solar collectors, also called "insulators", comprise a heat absorption means, most often a metal sheet, equipped with a system for removing the heat by means of a heat-carrying fluid, generally water or air. Such an absorber is usually protected by glazing in front of its face exposed to the solar radiation whereas a heat insulator is disposed therebehind.

2. Discussion of the Prior Art

A widespread type of absorber is formed from two stamped metal sheets, joined together by welding, so as to define therebetween a volume in which flows water serving as a heat-carrying fluid. Such an absorber involves however the use, for stamping the metal sheets, of high-power presses, which involves high investments costs, especially for small- or medium-scale manufacture, and increases considerably the manufacturing costs.

To avoid this disadvantage, it has been proposed to construct the absorber by means of two flat metal sheets, joined together by welding at their periphery, and connected by a number of spot welds distributed over the whole of their surface or by means of parallel welding beads, the metal sheets thus joined together being then shaped by exerting directly a hydraulic pressure by means of water injected between them. Such a manufacturing process has the advantage of being simple in principle, but it presents nevertheless serious disadvantages, not only from the manufacturing but also from the user point of view.

In fact, during the shaping of the metal sheets, it is difficult to control the deformation thereof, except by using a table for holding them in place thus limiting the deformation. Now, such tables are necessarily heavy, for they must resist the considerable thrust which is exerted thereon by the absorbers during their shaping. They are then difficult to handle and their use complicates the manufacture, all the more so since the water feeds to the absorber make it difficult to automate the different operations.

But, furthermore, during use, this type of absorber is not without disadvantage. In fact, if the deformation of the metal sheets has not been perfectly symmetrical, the absorber risks being subjected to a general deformation. Furthermore, the welding points present a permanent risk of breakage, for they are subjected to wrenching forces, because of the deformation of the metal sheets in their vicinity. In fact, the parts of each metal sheet surrounding the welding points tend to move away from one another, not only in parallel, under a general effect of the pressure, but also because of progressive detachment due to the distortion of the metal sheets which, not having been stamped, tend to become deformed.

SUMMARY OF THE INVENTION

The invention aims at providing an absorber formed from assembled metal sheets, which does not present the disadvantages of the absorbers of the known art, i.e. which may be manufactured at a reduced cost, without using large stamping presses, and which resists the high pressures of the heat-carrying liquid, without being subjected to troublesome distortions.

To this end, the invention provides an absorber for a solar collector comprising two thin stamped metal sheets joined together by welding at their periphery, between which flows a heat-carrying liquid, said metal sheets being stamped with repetitive patterns staggered in their plane in relation to each other obliquely, by an amount equal to at least half a pitch not only lengthwise but also widthwise, the hollow parts of said metal sheets having a sufficient area to come into contact and being connected by means of welding points disposed substantially symmetrically and evenly in relation to said patterns.

Because of the double staggering of the stamping patterns of the two metal sheets, the volume separating these latter will be smaller than in the same wetted surfaces of conventional absorbers made from stamped metal sheet, so that the amount of water in contact with the metal sheets will be less, which confers on the absorber a relatively low thermal inertia, favorable to a better efficiency, in regions with varying sunshine.

Moreover, because of the succession of staggered stamped patterns, having for example a rectangular or square shape, the liquid will flow from one pattern through two sides and penetrate consequently into two other patterns at one and the same time. The progress of the liquid between the metal sheets has then a tendency to take place naturally following an opening angle of 90°. If the intake of liquid is at a corner of the collector, for example by means of a pipe welded or crimped to one of the two metal sheets, the high turbulence of the liquid and the systematic division of the stream allow it to cover rapidly the whole area of the absorber, which also contributes to a maximum efficiency of collection.

Finally, the stamping of the metal sheets may be effected without the use of large presses, since each of the elementary patterns, whose area is reduced, may be stamped successively, which may be achieved at high speed with the known processes in the technique.

BRIEF DESCRIPTION OF THE DRAWINGS

Other characteristics and advantages of the invention will appear from the detailed description which follows, in which there will be recalled first of all the characteristics of the collectors of the prior art. In this description, reference will be made to the accompanying drawings in which:

FIGS. 1, 2 and 3 are schematical views, respectively from above, in longitudinal section and in transverse section of a known absorber;

FIGS. 4, 5 and 6 are similar views of another absorber of a known type;

FIGS. 7, 8 and 9 are similar schematical views of an absorber in accordance with the invention;

FIG. 10 is a top view on a larger scale of one embodiment of an absorber in accordance with the invention;

FIG. 11 is a section along line XI—XI of FIG. 10;

FIG. 12 is a partial section similar to FIG. 11 of a variation of this absorber.

DESCRIPTION OF THE PREFERRED EMBODIMENTS

As can be seen in FIGS. 1 to 3, absorbers of a known type comprise two middle sheets 1 and 2, connected at their periphery by welding beads 3, and between which flows a heat-carrying liquid, generally water. Metal sheets 1 and 2 are hollow stamped at 4, so as to come into mutual contact, and they are connected at their contact point 4 by a spot weld. The disadvantages of this type of collector (use of stamping presses of large capacity, so costly) were recalled above. It will be noted that it is the convex parts of the stamped surfaces which are in contact with one another, without transverse staggering, but on the contrary opposite each other.

A second type of known absorber is shown in FIGS. 4 to 5. It also comprises two metal sheets 5 and 6 joined together at their periphery by means of welding beads 7. These metal sheets are furthermore joined by parallel welding beads 8 and are deformed under hydraulic pressure so as to define a volume 9 in which the heat-carrying fluid flows. The disadvantages of this type of absorber, which were mentioned above, are risks of deformation of the metal sheets and of breakage of the welding beads.

FIGS. 7, 8 and 9 show schematically an absorber in accordance with the invention, which remedies these disadvantages. This absorber also comprises two thin metal sheets 10 and 11, joined together at their periphery by means of welding beads 12. In accordance with the invention, these metal sheets have been stamped with repetitive patterns 13 in relief, which are not disposed opposite one another, contrary to those of the absorber of FIGS. 1 to 3, but which are staggered in their plane, in relation to each other, by half a pitch. The metal sheets are furthermore joined together by spot welds 15 only some of which have been shown, disposed evenly and symmetrically over the flat parts which separate the stamped patterns.

FIGS. 10 and 11 illustrate an embodiment of such an absorber. In these figures, the parts already described have been shown with the same reference figures. The stamping patterns 13 are square patterns, but another preferred type comprises rectangular patterns. The water supply takes place through a pipe 16 welded at a corner of the absorber and the discharge takes place through a pipe 17 welded to the diagonally opposite corner. As has been explained, because of the staggering of the stamping patterns on the two plates, the water of one pattern 13 will be discharged through two sides of this pattern and will thus penetrate into two neighboring patterns, with accordingly a high turbulence of the water and improved efficiency of the collector.

As can be seen in the section of FIG. 11, the thickness of the sheet of water will be relatively small, which will also contribute to increasing the performances of the collector.

It will be noted that spot welds 15 join together the flat unstamped areas of metal sheets 10 and 11 at the middle of the sides of the square patterns of the stamped parts and that it is the concave surfaces of these stamped patterns which are opposite each other and not the convex surfaces, as in the prior art. As has already been indicated, the stamping of these small surfaces may be easily achieved at a high rate, by means of presses.

As shown in FIG. 12, one of the metal sheets may comprise, on both sides, a right-angled bend 18, for fixing the absorber.

In a practical embodiment of such an absorber, the Applicant has used stainless steel sheets of a thickness of 0.75 mm, but a thermosetting material or a thermoplastic material could also be used. The stamped patterns are 45 mm squares, in the center of a 60 mm square. The depth of the stamped pattern is from 2 to 3 mm and the corners of the square are slightly rounded so as to facilitate stamping. The stamped patterns are staggered by half a pattern in both directions, i.e. 30 mm, and so it is necessary for the peripheral patterns of each of the mating metal sheets to be at different distances from the edge of the metal sheets. The welding, partly running, is effected by spot welding on the flat unstamped parts, at the point of convergence of the axes passing through the middle of the sides of the squares. The ceiling of the absorber is provided by bead weldings on the edges of the four sides.

It will be noted that the absorber which has just been described may be used in a reverse manner, i.e. instead of absorbing heat and heating a heat-carrying fluid, it may be fed with hot water and radiate heat into the environment. Such an application, as a radiant central heating panel or as an exchanger in a hot-water reservoir comes within the scope of the invention.

What is claimed is:

1. An absorber for a solar collector comprising two sheets each of which are stamped with shapes which define a repetitive pattern having columns and rows, said shapes having generally concave surfaces, the stamped shapes of a column or row of a sheet being in fluid contact with at least four shapes of the columns and rows of the other sheet, said sheets having nonstamped portions which form at least one zone of contact which are connected by weld points regularly distributed therein; said sheets being joined together by welding at their periphery and having a liquid inlet pipe welded to a corner thereof and an outlet pipe welded to a diagonally opposite corner of said absorber, said sheets having a fluid flowing therebetween, said fluid entering said sheets through said inlet pipe and discharging through said outlet pipe.

2. A collector according to claim 1, characterized in that the stamped shapes have a square or rectangular form.

3. A collector according to claims 1 or 2 characterized in that the weld points are placed substantially along the central axes of the stamped shapes of the patterns said axes are extended onto the unstamped portions of the sheet whereby the unstamped portions of each sheet are thereby joined.

* * * * *